United States Patent
Yoshida

(10) Patent No.: US 9,454,347 B2
(45) Date of Patent: Sep. 27, 2016

(54) ANALYZING INCOMPLETE SOFTWARE

(71) Applicant: FUJITSU LIMITED, Kawasaki-shi, Kanagawa (JP)

(72) Inventor: Hiroaki Yoshida, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 145 days.

(21) Appl. No.: 13/830,292

(22) Filed: Mar. 14, 2013

(65) Prior Publication Data

US 2014/0282432 A1 Sep. 18, 2014

(51) Int. Cl.
G06F 9/44 (2006.01)
G06F 11/36 (2006.01)

(52) U.S. Cl.
CPC .............. *G06F 8/00* (2013.01); *G06F 11/3608* (2013.01); *G06F 11/3676* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 6,523,169 B1* | 2/2003 | Glunz | 717/124 |
| 6,895,578 B1* | 5/2005 | Kolawa et al. | 717/130 |
| 7,340,726 B1 | 3/2008 | Chelf et al. | |
| 7,478,367 B2 | 1/2009 | Morgan et al. | |
| 7,890,939 B2* | 2/2011 | Kulkarni et al. | 717/143 |
| 7,971,182 B1* | 6/2011 | Vlaovic | G06F 8/71 717/104 |
| 8,245,204 B2* | 8/2012 | Mak et al. | 717/140 |
| 8,352,923 B2* | 1/2013 | Lopian | 717/135 |
| 8,387,020 B1* | 2/2013 | MacLachlan et al. | 717/126 |
| 8,626,484 B1* | 1/2014 | Zhao et al. | 703/22 |
| 8,745,587 B2* | 6/2014 | Dhanakshirur et al. | 717/124 |
| 2005/0223018 A1* | 10/2005 | Forin et al. | 707/100 |
| 2007/0033443 A1* | 2/2007 | Tillmann et al. | 714/45 |
| 2008/0082969 A1* | 4/2008 | Agha et al. | 717/130 |
| 2008/0098377 A1* | 4/2008 | Barnak | 717/162 |
| 2011/0239194 A1* | 9/2011 | Braude | G06F 11/3688 717/124 |
| 2012/0180024 A1* | 7/2012 | Gonzalez | G06F 8/71 717/109 |
| 2012/0311536 A1* | 12/2012 | Fanning et al. | 717/123 |

OTHER PUBLICATIONS skorkin.com, "Code Issues specific to partial methods", Sep. 9, 2011, DevExpress CodeRush.*
Brett Daniel, "On Test Repair Using Symbolic Execution", Jul. 12, 2010, ACM 978-1-60558-823-0.*

* cited by examiner

*Primary Examiner* — Qing Wu
*Assistant Examiner* — Wynuel Aquino
(74) *Attorney, Agent, or Firm* — Maschoff Brennan

(57) ABSTRACT

A method of analyzing an incomplete software program may include receiving high-level software code of a software program that includes multiple functions. The multiple functions may include at least one incomplete function and at least one complete function. The method may further include compiling at least a portion of the high-level software code to generate low-level software code by compiling the complete function and passing over the incomplete function. The method may further include modifying the low-level software code to account for a call to the incomplete function in the low-level software code and symbolically executing the low-level software code.

20 Claims, 6 Drawing Sheets

ANALYZING INCOMPLETE SOFTWARE

FIELD

The embodiments discussed herein are related to analyzing incomplete software.

BACKGROUND

Symbolic execution is a technique for dynamically analyzing a software program. Symbolic execution uses as input values symbolic values instead of actual data and represents values of program variables as symbolic expressions. As a result, the outputs computed by a software program that is symbolically executed are expressed as a function of the symbolic inputs. Through symbolic execution, each path within a software program may be symbolically executed. Whenever symbolic execution along a path terminates (normally or with an error), a path constraint associated with the path is solved and the solution forms concrete test inputs, which may be used to execute the software program.

While symbolic execution provides good test coverage and generates test cases that may cover a majority of or all paths within a software program, symbolic execution may be time consuming and resource intensive. Additionally, a software program is typically analyzed to verify the functionality of the software program after a programmer has completed writing all the modules and functions of the software program so that the entire software program may be parsed and compiled. The software program may be analyzed by parsing and compiling the entire software program followed by dynamic analysis of the software program to identify errors within the software program. A user may have to wait for the dynamic analysis of the software program before being able to evaluate and fix the errors. Using symbolic execution to analyze the completed software program may increase the time to analyze a software program, thereby further increasing an already long development cycle of the software program.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of analyzing an incomplete software program may include receiving high-level software code of a software program that includes multiple functions. The multiple functions may include at least one incomplete function and at least one complete function. The method may further include compiling at least a portion of the high-level software code to generate low-level software code by compiling the complete function and passing over the incomplete function. The method may further include modifying the low-level software code to account for a call to the incomplete function in the low-level software code and symbolically executing the low-level software code.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to methods and systems of analyzing an incomplete software program. In particular, some embodiments relate to analyzing an incomplete software program using symbolic execution. An incomplete software program may be a program that is currently being written by a user. As a result, portions of the software program may be complete and other portions of the software program may be incomplete. In particular, various functions within the software program may be either complete or incomplete.

Analyzing an incomplete software program while the software program is being written may not increase the development time of the software program because the analysis may be performed concurrently with the writing of the software program. In most instances, the writing of the software program takes more time when performing a dynamic analysis of a software program, even when symbolic execution of the software program is performed. As a result, performing symbolic analysis of an incomplete software program as the program continues to be written may reduce the development time of the software program.

Embodiments of the present invention will be explained with reference to the accompanying drawings.

Figure 1:
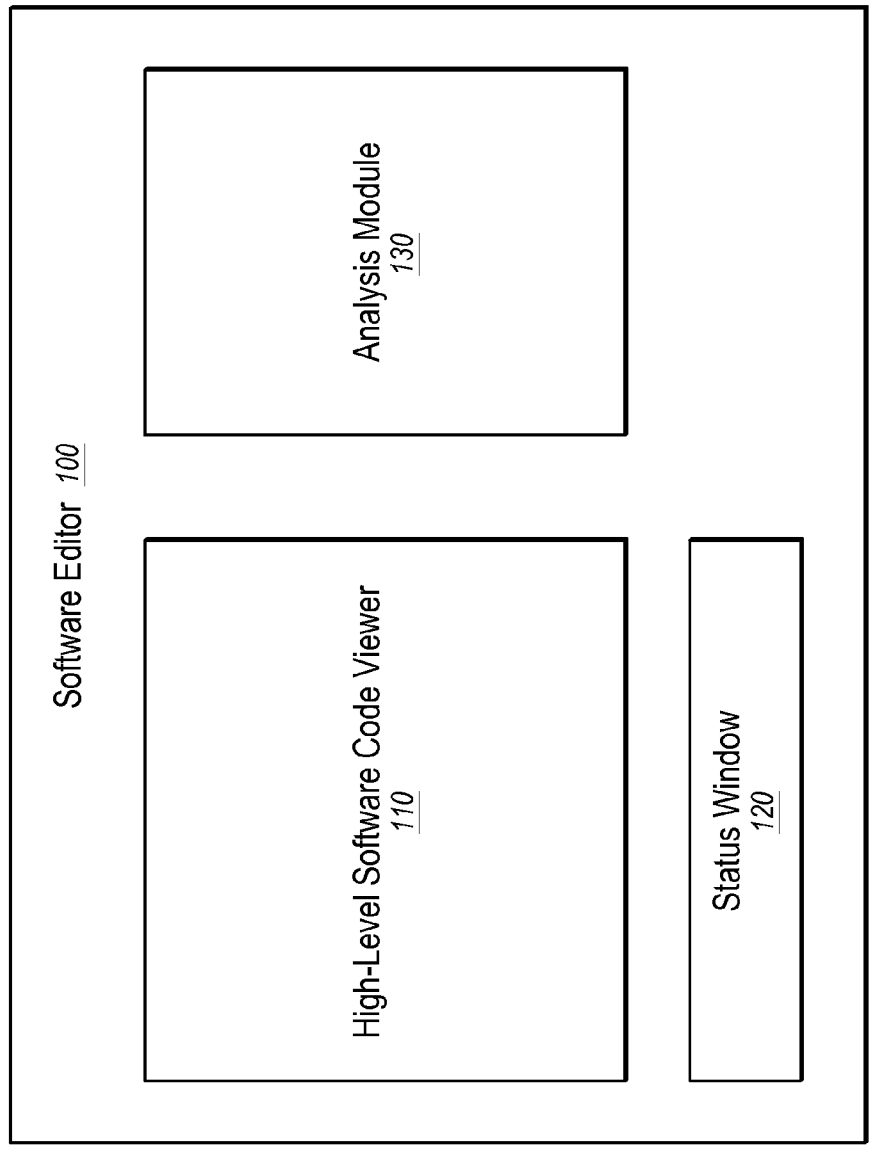
FIG. 1 illustrates an example software editor.

FIG. 1 illustrates an example software editor 100, arranged in accordance with at least one embodiment described herein. The software editor 100 may be configured to provide an interface for a user to develop a software program. In some embodiments, the software editor 100 may be configured to provide various features, such as authoring, modifying, compiling, deploying, and/or debugging a software program. In some embodiments, the software editor 100 may be an integrated development environment. In some embodiments, the software editor 100 may be a software editor that provides for writing and editing high-level software code and little more. The software editor 100 may be configured to be used with varying types of software programming languages, including, but not limited to, Perl, C, C++, C#, Java, JavaScript, Python, Ruby, assembly language, Fortran, common business-oriented language (COBOL), structured query language (SQL), and hypertext preproceesor (PHP).

The software editor 100, as illustrated, includes various windows and/or modules that provide functionality to a user that develops software programs. In particular, the software editor 100 includes a high-level software code viewer 110, a status window 120, and an analysis module 130.

The high-level software code viewer 110 may be configured as an interface for receiving high-level software code of a software program from a user. A user may type, speak, or use some other method to input the high-level software code into the high-level software code viewer 110. The high-level software code viewer 110 may also be configured to present high-level software code in the software editor 100 to a user. For example, a software program may be input into the software editor 100 and presented to a user by the high-level software code viewer 110.

High-level software code, as used herein, may indicate software code that is written using a human-readable format, such as text. High-level software code may be analogous to source code and may include source code of various programming languages, including, but not limited to, Perl, C, C++, C#, Java, JavaScript, Python, Ruby, assembly language, Fortran, COBOL, SQL, and PHP. Furthermore, as used herein, high-level software code may be different from low-level software code. Low-level software code as used herein may indicate software code that is in a machine-readable format, including but not limited to, byte code, object code, machine code, virtual instructions, and other intermediate representations of machine code. Generally speaking, high-level software code of a software program is generated by a user and low-level software code of the software program is generated by a compiler or some other module using the high-level software code. Thus, both high-level software code and low-level software code may represent a single software program, but at different levels of abstraction.

The status window 120 may be configured to provide a status of a software program presented in the high-level software code viewer 110. For example, the status window 120 may be configured to present reports indicating errors in the software program. Alternately or additionally, the status window 120 may be configured to provide other information regarding the software program.

The analysis module 130 may be configured to analyze an incomplete software program that is being developed using the software editor 100. In particular, the analysis module 130 may be configured to receive incomplete high-level software code of a software program being developed using the software editor 100, compile the incomplete high-level software code to generated low-level software code, and symbolically execute the low-level software code. Based on the symbolic execution of the low-level software code, the analysis module 130 may be configured to generate a report indicating any errors identified in the incomplete software program. The report may be displayed in the status window 120 of the software editor 100. Alternately or additionally, the analysis module 130 may be configured to generate test cases that may be used to execute the incomplete software program. In some embodiments, the test cases may be configured to generate errors, which may be indicated in a report generated by the analysis module 130, in the incomplete software program when executed and displayed in the status window 120.

In some embodiments, the analysis module 130 may analyze the incomplete software program while the high-level software code viewer 110 is receiving high-level software code from a user. In these and other embodiments, the software program as currently developed/written at a particular time may be received by the analysis module 130 from the high-level software code viewer 110, from a memory within the software editor 100, or from some other module within the software editor 100. The incomplete software program at the particular time may be high-level software code that includes complete functions and incomplete functions. The analysis module 130 may analyze the high-level software code as described previously.

In some embodiments, the analysis module 130 may analyze a software program multiple times during the development of the software program. For example, the analysis module may be configured to analyze the software program while it is incomplete and being developed based on a trigger. The trigger may be associated with a timer or the development of the software program. For example, analysis of the software program may be triggered based on the addition of a particular number of functions, characters, variables, or some other aspect of the software program. As another example, the analysis may be triggered every five or ten minutes or other periodic interval while the software program is being edited or written.

In some embodiments, the analysis module 130 may be configured to analyze the entire software program as currently developed every time that a trigger occurs. Alternately or additionally, the analysis module 130 may be configured to analyze a portion of the entire software program as currently developed. In these and other embodiments, the portion of the entire software program that is analyzed may be a portion that has not been previously analyzed by the analysis module 130. For example, the portion that is analyzed may be the portion that was added to the software program since the software program was last analyzed.

The analysis module 130 as described herein may allow analysis of a software program and the development of the software program to happen concurrently. As a result, the development time for the software program may be reduced. Alternately or additionally, analyzing the software program while the software program is being developed may reduce a number and/or severity of errors to resolve after the software program is developed.

Modifications, additions, or omissions may be made to the software editor 100 without departing from the scope of the present disclosure. For example, the software editor 100 may not include the analysis module 130. In these and other embodiments, the analysis module 130 may be part of another system or software and may be used to analyze software programs being developed in the software editor 100 as described herein. As another example, the software editor 100 may include various other modules than those described, For example, the software editor 100 may include a compiler, a debugger, among other modules. In some embodiments, the analysis module 130 may use other modules within the software editor 100 to perform analysis of the incomplete high-level software code. For example, the analysis module 130 may use a compiler within the software editor 100 to assist in analyzing the incomplete high-level software code.

Figure 2:
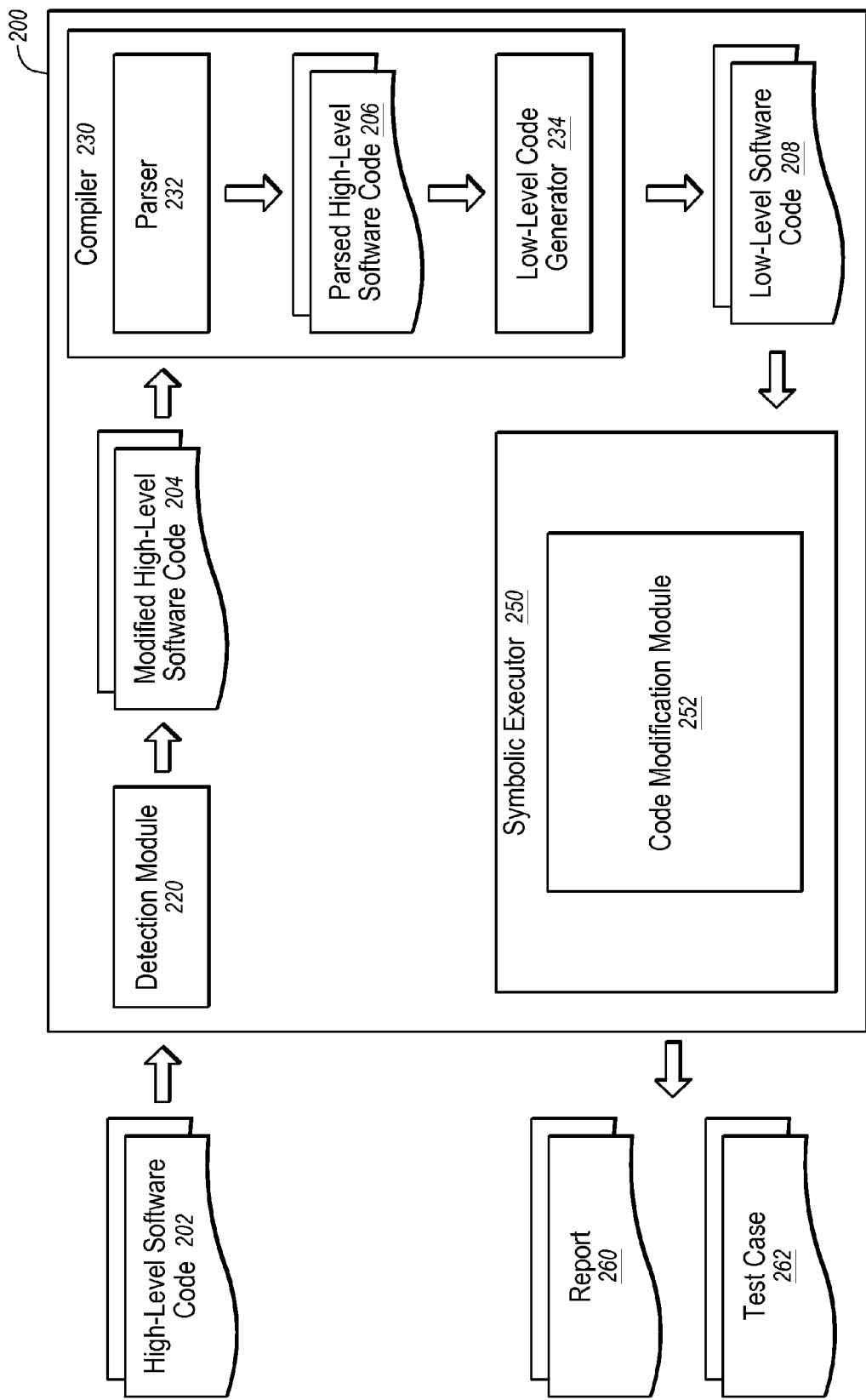
FIG. 2 is a block diagram of an example system of analyzing an incomplete software program.

FIG. 2 is a block diagram of an example system 200 of analyzing an incomplete software program, arranged in accordance with at least one embodiment described herein. The system 200 may be included in and/or may operate with the software editor 100 of FIG. 1 to perform analysis of incomplete software programs as described herein. The system 200 may be configured to analyze an incomplete software program during the development of the software program. The system 200 may include a detection module 220, a compiler 230, and a symbolic executor 250. The compiler 230 may include a parser 232 and a low-level code generator 234. The symbolic executor 250 may include a code modification module 252. Each of the detection module 220, the compiler 230, and the symbolic executor 250 may be configured to communicate with each other to allow data and information to be shared there between.

The system 200 may be configured to receive high-level software code 202. The high-level software code 202 may be received from a software editor, such as the software editor 100 of FIG. 1 or from some other source.

The high-level software code 202 may be incomplete. In particular, the high-level software code 202 may include multiple functions where at least one of the functions may be a complete function and at least one of the functions may be an incomplete function. A function may be considered complete when the function is able to be parsed by the parser 232 and incomplete when the function is unable to be parsed by the parser 232. The high-level software code 202 may be written in any one of various types of software programming languages, including but not limited to Perl, C, C++, C#, Java, JavaScript, Python, Ruby, assembly language, Fortran, COBOL, SQL, and PHP.

The high-level software code 202 may be received first by the detection module 220. In some embodiments, the detection module 220 may be configured to compare the high-level software code 202 to previously received high-level software code. If a version of the high-level software code 202 has been previously received by the detection module 220, the detection module 220 may be configured to determine the differences between the high-level software code 202 and the previous version of the high-level software code 202. The portions of the high-level software code 202 determined to be different from the previous version of the high-level software code 202 may be output by the detection module 220 as modified high-level software code 204.

If a version of the high-level software code 202 has not been previously received by the detection module 220 or the detection module 220 is unable to determine if a previous version of the high-level software code 202 has been previously received, (e.g. the high-level software code 202 has been modified to such a degree as compared to a previous version that the high-level software code 202 is practically a new software program), the detection module 220 may output the high-level software code 202 as the modified high-level software code 204.

The compiler 230 may be configured to receive the modified high-level software code 204. In particular, the parser 232 may be configured to receive the modified high-level software code 204. The parser 232 may be configured to analyze the modified high-level software code 204 to determine what portions of the modified high-level software code 204 are syntactically correct based on a programming language of the modified high-level software code 204. In particular, the parser 232 may be configured to determine functions that are syntactically correct and functions that are syntactically incorrect. Syntactically correct functions may be considered herein as complete functions and syntactically incorrect functions may be considered herein as incomplete functions.

Typical parsers may parse high-level software code until the parser determines that a portion of the high-level software code is syntactically incorrect. The parser 232 may be configured to parse portions of the modified high-level software code 204 even after identifying portions of the modified high-level software code 204 that are syntactically incorrect. In these and other embodiments, when the parser 232 determines that a function is syntactically incorrect (incomplete), the parser 232 may skip the remaining portions of the incomplete function and may continue parsing other functions within the modified high-level software code 204. In this manner, the parser 232 may parse the complete functions within the modified high-level software code 204 even if the complete functions are parsed after the parser 232 identifies incomplete functions.

The parser 232 may be configured to output the parsed complete functions as parsed high-level software code 206. The parsed high-level software code 206 may be sent to the low-level code generator 234. In some embodiments, the parsed high-level software code 206 may be in a form of a parse tree generated by the parser 232. The parse tree may illustrate the syntactic relationship between the elements within the complete functions of the modified high-level software code 204.

In some embodiments, the parser 232 may be further configured to generate a look-up table indicating whether the functions in the modified high-level software code 204 are incomplete or complete. The look-up table may include information such as a type of a return value for the incomplete functions. In these and other embodiments, the symbolic executor 250 and in particular, the code modification module 252, may access the look-up table.

The low-level code generator 234 may be configured to generate low-level software code 208 based on the parsed high-level software code 206. In particular, the low-level code generator 234 may translate the parsed high-level software code 206 into the low-level software code 208. The low-level software code 208 may include instructions specific to the symbolic executor 250 that allow the symbolic executor 250 to symbolically execute the low-level software code 208. For example, in some embodiments, the low-level software code 208 may be in a symbolic form for execution by the symbolic executor 250. In some embodiments, the low-level code generator 234 may further be configured to optimize the low-level software code 208 for symbolic execution by the symbolic executor 250.

The symbolic executor 250 may be configured to receive the low-level software code 208 from the low-level code generator 234 and to symbolically execute the low-level software code 208. In some embodiments, the low-level software code 208 may be in symbolic form and thus ready for symbolic execution by the symbolic executor 250. Alternately, the symbolic executor 250 may translate the low-level software code 208 into symbolic form before or currently with the symbolic execution of the low-level software code 208.

By symbolically executing the low-level software code 208, the symbolic executor 250 may analyze a portion of, a majority of, or all of the paths within the low-level software code 208. Based on the analysis of the paths within the low-level software code 208, the symbolic executor 250 may be configured to identify errors within the low-level software code 208. The errors may include logical errors, accessing of illegal memory locations, uninitialized pointers, divide by zero, out-of-bounds memory access, memory leaks where memory is allocated but never de-allocated, among others. The identified errors may be collected and output in a report 260. In some embodiments, the report 260 may be presented to a user that is developing the high-level software code 202. For example, the report 260 or a portion thereof may be displayed in a status window, such as the status window 120 of FIG. 1.

In some embodiments, the symbolic executor 250 may be configured to generate symbolic path conditions for the paths within the low-level software code 208 that are analyzed. The symbolic path conditions may be solved using a constraint solver. The output of the constraint solver may be a test case 262. The test case 262 may include one or more concrete variables that may be used to stimulate a concrete execution of the low-level software code 208 that follows the paths within the low-level software code 208 that were symbolically executed. In some embodiments, the test case 262 may include concrete variables that when used to stimulate a concrete execution of the low-level software code 208 result in the errors contained within the report 260. Being able to generate the errors using the test case 262 may assist a user when using a debugging program or other program to identify, understand, and/or correct the errors.

In some embodiments, the low-level software code 208 being symbolically executed by the symbolic executor 250 may include calls to incomplete functions. For example, a complete function in the low-level software code 208 may include a call to an incomplete function. Calls to incomplete functions in the low-level software code 208 may be problematic to the symbolic execution of the low-level software code 208 because the incomplete function may be undefined in the low-level software code 208. For example, a complete function that includes operations or variables that rely on or use a return value of an incomplete function may not, in some circumstances, be symbolically executed past the call to the incomplete function because the return value would be nonexistent due to the incomplete function being undefined.

Figure 3A:
FIG. 3A illustrates an example function.

FIG. 3A illustrates an example function 300 that uses a return value of an incomplete function, functionC, arranged in accordance with at least one embodiment described herein. The function 300 includes a line 302 with a call to a complete functionB where a return value of the functionB is set equal to variable2 and a line 304 with a call to the incomplete functionC where a return value of the functionC is set equal to variable3. In line 306, the variable3 is used in conjunction with other variables to determine a return value for the function 300. Symbolic execution of the function 300 may not, in some circumstances, proceed past line 304 because a symbolic executor may not be able to understand how to handle the call to the incomplete and thus undefined functionC.

Returning to the discussion of FIG. 2, in some embodiments, the code modification module 252 of the symbolic executor 250 may be configured to identify calls to incomplete functions in the low-level software code 208 and to modify the low-level software code 208 to improve the symbolic execution of the low-level software code 208 when it includes a call to an incomplete function.

In some embodiments, to identify incomplete function calls in the low-level software code 208, the code modification module 252 may first identify each function call in the low-level software code 208. After identifying a function call, the code modification module 252 may reference a look-up table that indicates whether a function is an incomplete function or a complete function, such as the look-up table that may be created by the parser 232. When a function is an incomplete function, the code modification module 252 may modify the low-level software code 208 to account for the call to the incomplete function.

Figure 3B:
FIG. 3B illustrates the example function of FIG. 3A after symbolic variable substitution.

The code modification module 252 may modify the low-level software code 208 differently based on how an incomplete function is called in the low-level software code 208. For example, the low-level software code 208 may include a call to an incomplete function and have a variable be set to the return value of the incomplete function. In these and other embodiments, the code modification module 252 may be configured to substitute the call to the incomplete function with a symbolic variable that is of the same type as a return value of the incomplete function. By substituting the symbolic variable for the call to the incomplete function, the low-level software code 208 that includes the call to the incomplete function may be symbolically executed by the symbolic executor 250. FIG. 3B illustrates an example function 300' that is the result of symbolic variable substitution in the function 300 of FIG. 3A, arranged in accordance with at least one embodiment described herein. The function 300' includes the line 302 with the call to the complete functionB and a line 304' that differs from the line 304 of the function 300 by substituting a symbolic variable called symbolicvariable for the call to the incomplete functionC.

Returning to the discussion of FIG. 2, in some embodiments, the code modification module 252 may be configured to identify calls to incomplete functions and to modify the low-level software code 208 before the symbolic executor 250 begins symbolically executing the low-level software code 208. Alternately or additionally, the code modification module 252 may be configured to identify calls to incomplete functions and to modify the low-level software code 208 during symbolic execution of the low-level software code 208. For example, while a first instruction of the low-level software code 208 is symbolically executed and/or after the first instruction is symbolically executed but before a second instruction of the low-level software code 208 is symbolically executed, the code modification module 252 may determine if the second instruction is a call to an incomplete function. When the second instruction is a call to an incomplete function, the code modification module 252 may modify the second instruction and/or other portions of the low-level software code 208 to account for the call to the incomplete function.

Modifications, additions, or omissions may be made to the system 200 without departing from the scope of the present disclosure. For example, in some embodiments, the system 200 may not include the detection module 220. In these and other embodiments, the high-level software code 202 received by the system 200 may pass to the compiler 230.

In some embodiments, the compiler 230 and the symbolic executor 250 may form part of a single module such as an interpreter. In these and other embodiments, the parsing of the high-level software code 202, the generating of the low-level software code 208, and the symbolic execution of the low-level software code 208 may be performed by the interpreter. Furthermore, in these and other embodiments, the parsing, generating, and symbolic execution may be not performed as discrete steps. A portion of the high-level software code 202 may be parsed, low-level software code may be generated for that portion, and that portion may be symbolically executed before other portions of the high-level software code are parsed and have corresponding low-level software code generated and symbolically executed.

Figure 4:
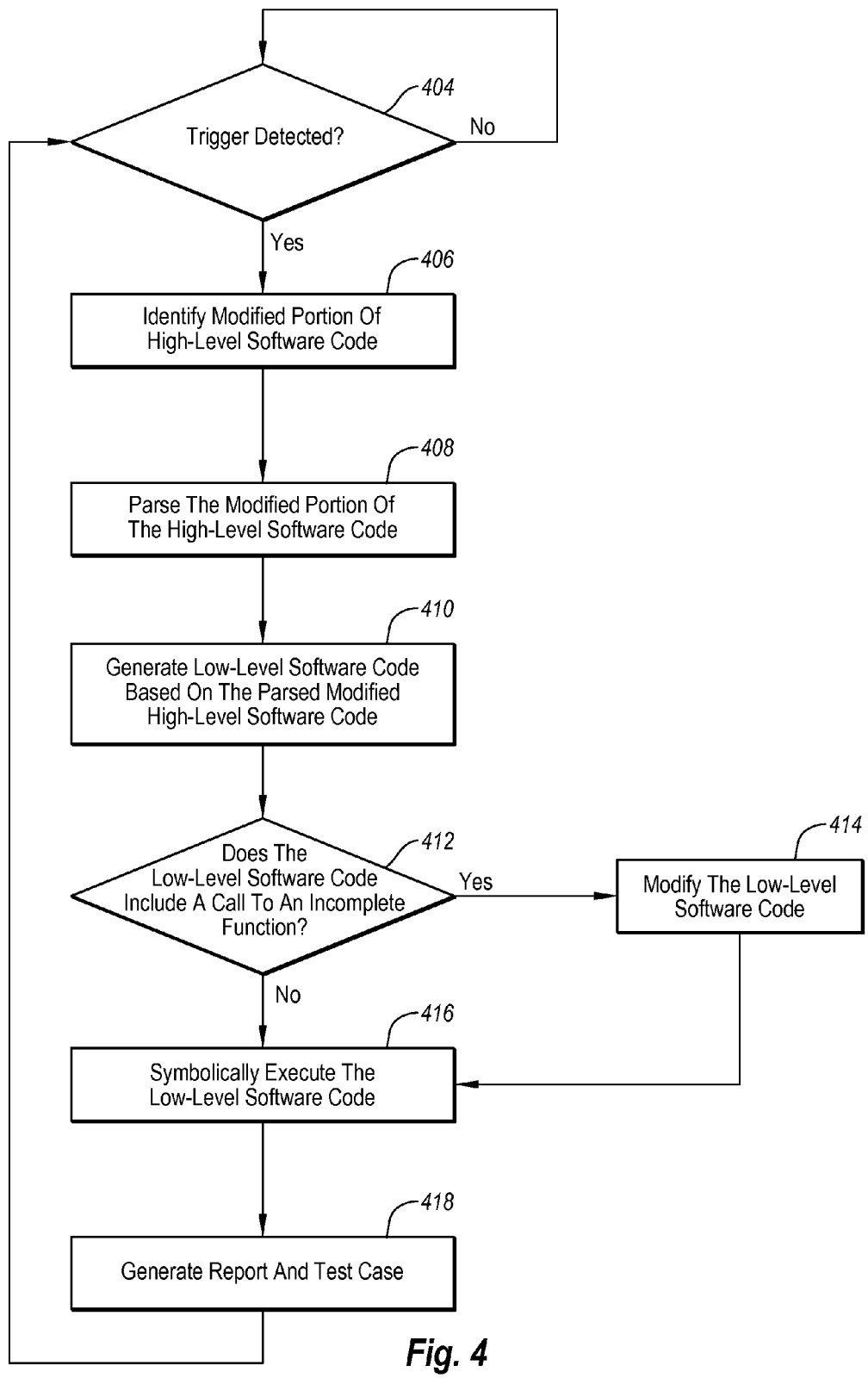
FIG. 4 is a flow chart of an example method of periodically analyzing an incomplete software program.

FIG. 4 is a flow chart of an example method 400 of periodically analyzing an incomplete software program, arranged in accordance with at least one embodiment described herein. The method 400 may be implemented, in some embodiments, by a system, such as the system 200 of FIG. 2. Although illustrated as discrete blocks, various blocks may be divided into additional blocks, combined into fewer blocks, or eliminated, depending on the desired implementation.

The method 400 may begin at block 402, where a trigger for analyzing incomplete high-level software code may be detected. In some embodiments, the trigger may be associated with a timer. For example, the trigger may occur and be detected after a particular time interval has been spent editing or writing the incomplete high-level software code. Example time intervals may include 5 minutes, 10 minutes, or 15 minutes. Alternately or additionally, the trigger may occur and may be detected after a certain amount of modifications have been made to the incomplete high-level software code. As a result, the trigger may occur and may be detected periodically during the development of the incomplete high-level software code. When the trigger is detected, the method 400 may proceed to block 406. When the trigger does not occur, the method 400 may wait for the trigger to be detected.

In block 406, a portion of the incomplete high-level software code modified since a last analysis of the incomplete high-level software code may be identified. In block 408, the modified portion of the incomplete high-level software code may be parsed. During parsing of the modified portion of the incomplete high-level software code, the complete functions and incomplete functions of the modified portion of the incomplete high-level software code may be identified.

In block 410, low-level software code may be generated based on the parsed and modified portion of the incomplete high-level software code and, in particular, the parsed complete functions of the modified incomplete high-level software code. In some embodiments, the low-level software code may also be optimized.

In block 412, it may be determined if the low-level software code includes one or more calls to incomplete functions. When the low-level software code includes calls to one or more incomplete functions, the method 400 may proceed to block 414. When the low-level software code does not include calls to one or more incomplete functions, the method 400 may proceed to block 416.

In block 414, the low-level software code may be modified to account for the calls to the one or more incomplete functions within the low-level software code. In some embodiments, where variables are set to return values of the calls to the one or more incomplete functions, the calls to the incomplete functions may be substituted for symbolic variables of the same type as the return values for the one or more incomplete functions.

In block 416, the low-level software code may be symbolically executed. In block 418, a report that may include errors identified in the low-level software code may be generated. Additionally or alternately, one or more test cases may be generated based on the symbolic execution of the low-level software code. The block 418 may be followed by block 404 where the method 400 may await the detection of another trigger to again analyze the incomplete high-level software code.

Embodiments of the method 400 provide analysis of an incomplete software program during development of the software program. In particular, the method 400 provides periodic symbolic analysis of an incomplete software program concurrently with the writing and/or editing of the software program. By periodically analyzing the incomplete software program concurrently with the writing and/or editing of the software program, the development time of the software program may be reduced.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, block 406 may be omitted from the method 400. In these and other embodiments, all of the high-level software code and not just a modified portion of the high-level software code may be analyzed by the method 400. Furthermore, the method 400 may also be applied to programming languages that are generally executed by interpreters rather than compiled and then executed.

As another example, blocks 412, 414, and 416 may be combined. In these and other embodiments, the low-level software code may be checked for calls to incomplete functions and may be modified to account for the calls to the one or more incomplete functions during symbolic execution of the low-level software code. For example, when a call to a function during symbolic execution of the low-level software is encountered, the call could be checked to determine if the call is to an incomplete function. When the call is to an incomplete function, the call may be substituted for a symbolic variable as discussed herein. In this manner, the low-level software code may be modified during symbolic execution of the low-level software code.

Figure 5:
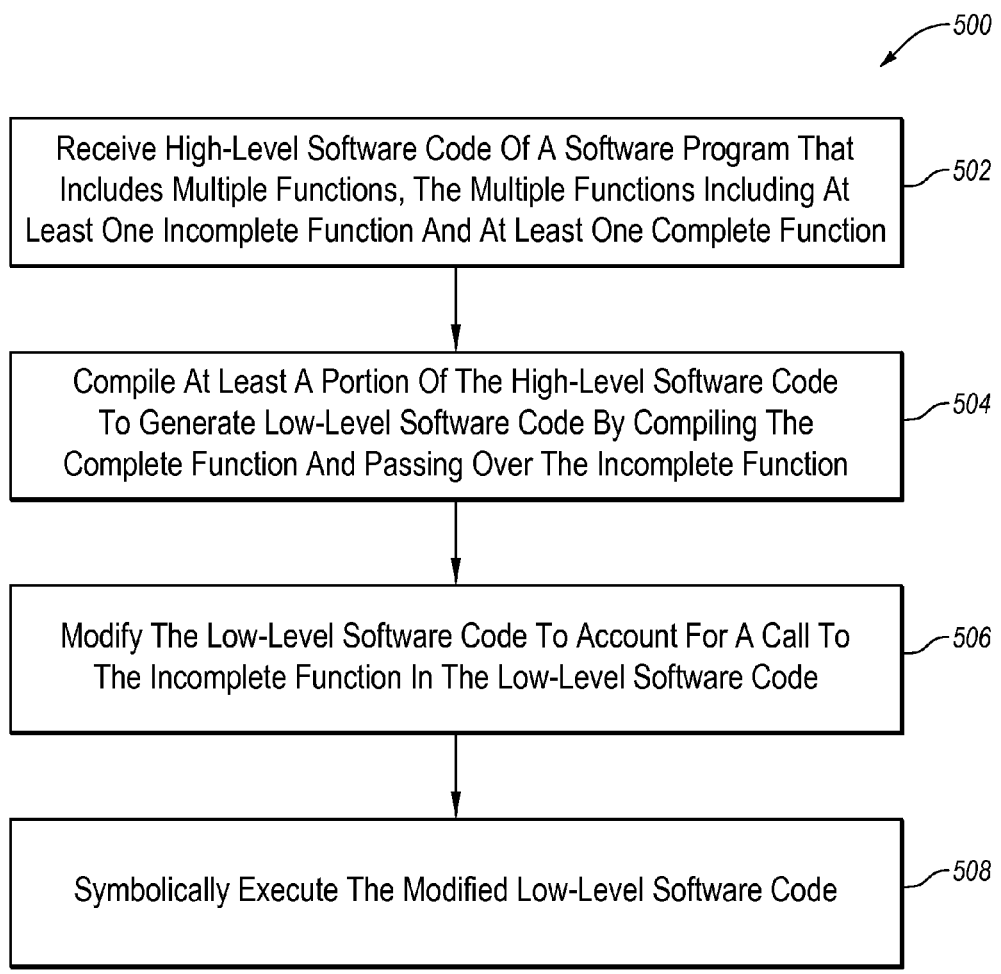
FIG. 5 is flow chart of example method of analyzing an incomplete software program.

FIG. 5 is a flow chart of an example method 500 of analyzing an incomplete software program, arranged in accordance with at least one embodiment described herein. The method 500 may be implemented, in some embodiments, by a system, such as the system 200 of FIG. 2. Although illustrated as discrete blocks, various blocks may be divided into additional blocks, combined into fewer blocks, or eliminated, depending on the desired implementation.

The method 500 may begin at block 502, where high-level software code of a software program that includes multiple functions may be received. The multiple functions of the software program may include at least one incomplete function and at least one complete function. An incomplete function may be a function that has syntax errors and is not able to be compiled. A complete function may be a function that does not have syntax errors and is able to be compiled.

In block 504, at least a portion of the high-level software code may be compiled to generate low-level software code by compiling the complete function and passing over the incomplete function. In some embodiments, compiling the high-level software code includes parsing the high-level software code to identify the complete function and to identify the incomplete function. The parsing of the high-level software code may continue after identifying the incomplete function. In other words, the parsing of the high-level software code may not stop when an incomplete function, e.g. a function with syntax errors is identified. Rather, the parsing of the high-level software code may continue until every function in the high-level software code has been parsed or has been identified as an incomplete function.

In block 506, the low-level software code may be modified to account for a call to the incomplete function in the low-level software code. In some embodiments, modifying the low-level software code may include substituting a symbolical variable with a type similar to the type for a return value of the incomplete function for the call to the incomplete function.

In block 508, the modified low-level software code may be symbolically executed. In some embodiments, the entire low-level software code may be modified before the modified low-level software code is symbolically executed. Alternately or additionally, a portion of the low-level software code may be being modified concurrently with the symbolic execution of a second portion of the low-level software code that has been modified.

In some embodiments, the method 500 may further include generating a report based on the symbolic execution of the modified low-level software code. The report may indicate one or more errors within the software program. For example, the report may indicate errors such as logical errors, accessing of illegal memory locations, uninitialized pointers, divide by zero, out-of-bounds memory access, memory leaks where memory is allocated but never deallocated, among other errors.

In some embodiments, the method 500 may further include generating one or more test cases for the software program based on the symbolic execution of the modified low-level software code. The one or more test cases may be configured to generate errors within the software program identified by symbolically executing the low-level software code.

In some embodiments, the method 500 may be performed to provide periodic symbolic analysis of an incomplete software program concurrently with the writing and/or editing of the software program.

In some embodiments, various blocks in the method 500 may not be performed as discrete steps with respect to the high-level software code. For example, a portion of the high-level software code may be compiled at block 504 to generate the low-level software code. At block 506, the low-level software code may be modified, and then at block 508, the modified low-level software code may be symbolically executed. At the same time or at a subsequent time, another portion of the high-level software code may be compiled at block 504 to generate the low-level software code. At block 506, the low-level software code may be modified, and then at block 508, the modified low-level software code may be symbolically executed. In this manner, the method 500 may be applied to programming languages that are generally executed by interpreters rather than being compiled and then executed.

Figure 6:
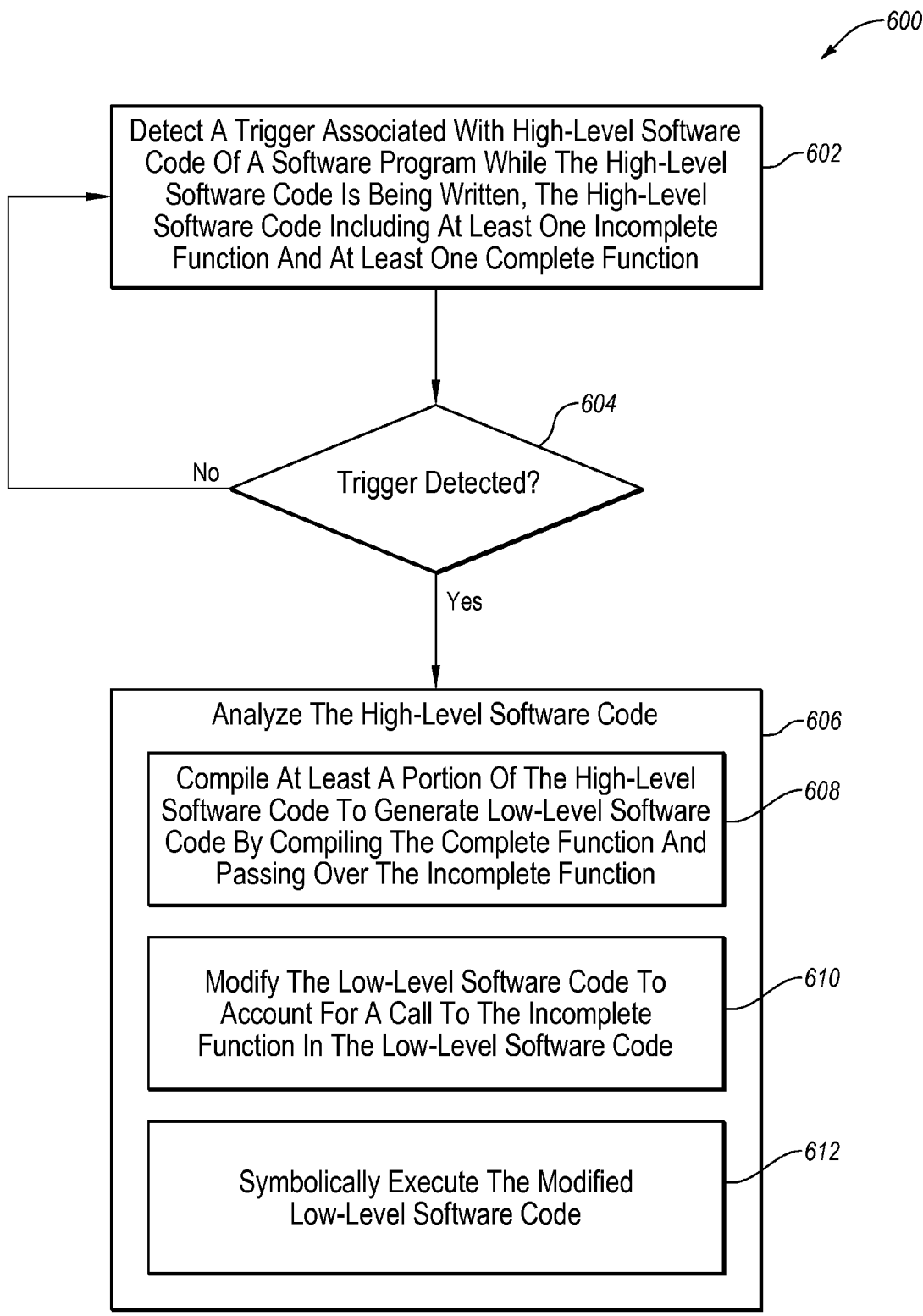
FIG. 6 is flow chart of another example method of analyzing an incomplete software program.

FIG. 6 is a flow chart of another example method 600 of analyzing an incomplete software program, arranged in accordance with at least one embodiment described herein. The method 600 may be implemented, in some embodiments, by a system, such as the system 200 of analyzing an incomplete software program of FIG. 2. Although illustrated as discrete blocks, various blocks may be divided into additional blocks, combined into fewer blocks, or eliminated, depending on the desired implementation.

The method 600 may begin at block 602, where a trigger associated with high-level software code of a software program may be detected while the high-level software code is being written. The high-level software code may include at least one incomplete function and at least one complete function. An incomplete function may be a function that has syntactical errors and is not able to be compiled. A complete function may be a function that does not have syntactical errors and is able to be compiled. In some embodiments, the trigger may be based on a change in the high-level software code, a timer, or a number of characters added to the high-level software code.

In block 604, it may be determined whether the trigger has been detected. When the trigger has been detected, the method 600 may proceed to block 606. When the trigger has not been detected, the method 600 may proceed back to block 602.

In block 606, the high-level software code may be analyzed. Blocks 608, 610, and 612 may describe various aspects of the analysis of the high-level software code.

In block 608, at least a portion of the high-level software code may be compiled to generate low-level software code by compiling the complete function and passing over the incomplete function. In some embodiments, compiling the high-level software code includes parsing the high-level software code to identify the complete function and to identify the incomplete function. The parsing of the high-level software code may continue after identifying the incomplete function.

In block 610, the low-level software code may be modified to account for a call to the incomplete function in the low-level software code. In some embodiments, modifying the low-level software code may include substituting a symbolical variable with a type similar to the type for a return value of the incomplete function for the call to the incomplete function.

In block 612, the modified low-level software code may be symbolically executed. In some embodiments, the entire low-level software code may be modified before the modified low-level software code is symbolically executed. Alternately or additionally, a portion of the low-level software code may be being modified concurrently with the symbolic execution of a second portion of the low-level software code that has been modified.

In some embodiments, the analysis of the high-level software code may further include identifying a portion of the high-level software code that has been modified since an analysis of the high-level software code was last performed. In these and other embodiments, the identified portion of the high-level software code that has been modified is compiled.

In some embodiments, the analysis of the high-level software code may further include generating a report based on the symbolic execution of the modified low-level software code. The report may indicate one or more errors within the software program. In some embodiments, the analysis of the high-level software code may further include generating one or more test cases for the software program based on the symbolic execution of the modified low-level software code. The one or more test cases may be configured to generate errors within the software program identified by symbolically executing the low-level software code.

In some embodiments, the method 600 may be performed to provide periodic symbolic analysis of an incomplete software program concurrently with the writing and/or editing of the software program. In these and other embodiments, the detecting the trigger and the analyzing the high-level software code may be repeated while the high-level software code is written and/or edited. In some embodiments, the method 600 may also be applied to programming languages that are generally executed by interpreters rather than compiled and then executed.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of analyzing an incomplete software program, the method comprising:
   receiving high-level software code of a software program that includes a plurality of functions, the plurality of functions including at least one incomplete function and at least one complete function;
   compiling at least a portion of the high-level software code to generate low-level software code in symbolic form by compiling the complete function and passing over the incomplete function, the symbolic form including representing variables in the high-level software code as symbolic variables that when symbolically executed are represented by symbolic expressions without a defined value;
   after generating the low-level software code with the incomplete function, modifying the low-level software code with a symbolic variable to account for a call to the incomplete function in the low-level software code, the symbolic variable being a variable type that is the same as a variable type of a return value of the incomplete function and the symbolic variable not being defined in the high-level software code;
   symbolically executing the modified low-level software code, the symbolic execution of the symbolic variable resulting in a symbolic expression without a defined value that is part of a symbolic path condition generated during the symbolic execution, the symbolic expression not defined in the high-level software code or the low-level software code; and
   solving the symbolic path condition, which includes the symbolic expression resulting from the symbolic variable, using a constraint solver.

2. The method of claim 1, wherein the modifying occurs before or while the low-level software code is symbolically executed.

3. The method of claim 1, wherein the modifying the low-level software code with the symbolic variable includes substituting the call to the incomplete function with the symbolic variable.

4. The method of claim 1, wherein the high-level software code of the software program is a current version of the high-level software code of the software program, the method further comprising:
   receiving a previous version of the high-level software code of the software program;
   comparing the previous version of the high-level software code of the software program with the current version of the high-level software code of the software programs; and
   determining a first portion of the current version of the high-level software code not included in the previous version of the high-level software code based on the comparison, wherein the at least the portion of the high-level software code compiled is the first portion of the current version of the high-level software code,
   wherein the modifying the low-level software code with the symbolic variable includes substituting the call to the incomplete function with the symbolic variable and the modifying the low-level software code occurs while the low-level software code is symbolically executed.

5. The method of claim 1, further comprising generating a report based on the symbolic execution of the modified low-level software code, the report indicating one or more errors within the software program.

6. The method of claim 1, further comprising generating one or more test cases for the software program based on the symbolic execution of the modified low-level software code, the one or more test cases configured to generate errors within the software program identified by symbolically executing the modified low-level software code.

7. The method of claim 1, wherein compiling the high-level software code includes parsing the high-level software code to identify the complete function of the plurality of functions and to identify the incomplete function of the plurality of functions, wherein parsing of the high-level software code continues after identifying the incomplete function.

8. A processor configured to execute computer instructions from a computer readable medium to cause a system to perform operations to analyze an incomplete software program, the operations comprising:
   receiving high-level software code of a software program that includes a plurality of functions, the plurality of functions including at least one incomplete function and at least one complete function;
   compiling at least a portion of the high-level software code to generate low-level software code in symbolic form by compiling the complete function and passing over the incomplete function, the symbolic form including representing variables in the high-level software code as symbolic variables that when symbolically executed are represented by symbolic expressions without a defined value;

modifying the low-level software code with a symbolic variable to account for a call to the incomplete function in the low-level software code, the symbolic variable being a variable type that is the same as a variable type of a return value of the incomplete function and the symbolic variable not being defined in the high-level software code;
symbolically executing the modified low-level software code, the symbolic execution of the symbolic variable resulting in a symbolic expression without a defined value that is part of a symbolic path condition generated during the symbolic execution, the symbolic expression not defined in the high-level software code or the low-level software code; and
solving the symbolic path condition, which includes the symbolic expression resulting from the symbolic variable, using a constraint solver.

9. The processor of claim 8, wherein the modifying occurs before or while the low-level software code is symbolically executed.

10. The processor of claim 8, wherein the modifying the low-level software code with the symbolic variable includes substituting the call to the incomplete function with the symbolic variable.

11. The processor of claim 8, wherein the high-level software code of the software program is a current version of the high-level software code of the software program, the operations further comprising:
receiving a previous version of the high-level software code of the software program;
comparing the previous version of the high-level software code of the software program with the current version of the high-level software code of the software programs; and
determining a first portion of the current version of the high-level software code not included in the previous version of the high-level software code based on the comparison, wherein the at least the portion of the high-level software code compiled is the first portion of the current version of the high-level software code.

12. The processor of claim 8, wherein compiling the high-level software code includes parsing the high-level software code to identify the complete function of the plurality of functions and the incomplete function of the plurality of functions, wherein parsing of the high-level software code continues after identifying the incomplete function.

13. A method of analyzing an incomplete software program, the method comprising:
detecting a trigger associated with high-level software code of a software program while the high-level software code is being written, the high-level software code including at least one incomplete function and at least one complete function;
when the trigger is detected, analyzing the high-level software code, including:
compiling at least a portion of the high-level software code to generate low-level software code in symbolic form by compiling the complete function and passing over the incomplete function, the symbolic form including representing variables in the high-level software code as symbolic variables that when symbolically executed are represented by symbolic expressions without a defined value;
after generating the low-level software code with the incomplete function, modifying the low-level software code with a symbolic variable to account for a call to the incomplete function in the low-level software code, the symbolic variable being a variable type that is the same as a variable type of a return value of the incomplete function and the symbolic variable not being defined in the high-level software code;
symbolically executing the modified low-level software code, the symbolic execution of the symbolic variable resulting in a symbolic expression without a defined value that is part of a symbolic path condition generated during the symbolic execution, the symbolic expression not defined in the high-level software code or the low-level software code; and
solving the symbolic path condition, which includes the symbolic expression resulting from the symbolic variable, using a constraint solver.

14. The method of claim 13, wherein the modifying occurs before or while the low-level software code is symbolically executed.

15. The method of claim 13, wherein the modifying the low-level software code with the symbolic variable includes substituting the call to the incomplete function with the symbolic variable.

16. The method of claim 13, wherein the high-level software code of the software program is a current version of the high-level software code of the software program, the method further comprising:
receiving a previous version of the high-level software code of the software program;
comparing the previous version of the high-level software code of the software program with the current version of the high-level software code of the software programs; and
determining a first portion of the current version of the high-level software code not included in the previous version of the high-level software code based on the comparison, wherein the at least the portion of the high-level software code compiled is the first portion of the current version of the high-level software code,
wherein the trigger associated with high-level software code is a particular amount of time passing between receiving the previous version of the high-level software code and receiving the current version of the high-level software code.

17. The method of claim 13, wherein the trigger is based on a change in the high-level software code, a timer, or a number of characters added to the high-level software code.

18. The method of claim 13, wherein the detecting and the analyzing are repeated while the high-level software code is written and/or edited.

19. The method of claim 18, wherein the analyzing further includes identifying a section of the high-level software code that is modified since a last analysis of the high-level software code, wherein the section of the high-level software code that is compiled is the section that is identified.

20. The method of claim 13, wherein the analyzing further includes generating a report based on the symbolic execution of the modified low-level software code, the report including one or more of:
an indication of one or more errors within the software program, and
one or more test cases for the software program based on the symbolic execution of the modified low-level software code, the one or more test cases configured to generate errors within the software program identified by symbolically executing the modified low-level software code.

* * * * *